United States Patent Office 2,801,982
Patented Aug. 6, 1957

2,801,982

ACRYLONITRILE POLYMER PASTES

Otto Fuchs, Frankfurt am Main Hochst, Germany, assignor to Farbwerke Hoechst Aktiengesellschaft vormals Meister Lucius und Bruning, Frankfurt am Main Hochst, Germany, a company of Germany No Drawing. Application December 9, 1952,
Serial No. 325,020

Claims priority, application Germany December 15, 1951

7 Claims. (Cl. 260—29.1)

This invention relates to a new composition of matter, more particularly to pastes of polymers of acrylonitrile containing in the polymer molecule at least about 85% by weight of acrylonitrile.

Shaped articles of poly-acrylonitrile, for instance, threads, bristles, foils, and the like can be prepared by dissolving poly-acrylonitrile in a solvent which evaporates in the course of the shaping operation. This process, however, has the drawback that the solvents known to be suitable for poly-acrylonitrile, for instance the preferred dimethylformamide, have a very high boiling point so that they can be removed only by working at temperatures of about 200° C. or higher temperatures. Apart from the difficulties inherent to such heat treatment, there is the risk of a partial decomposition of the poly-acrylonitrile taking place. Numerous attempts have already been made to use as solvent for poly-acrylonitrile one having a lower boiling point, but no satisfactory results could be obtained up to now.

It is an object of this invention to produce a paste of poly-acrylonitrile or a copolymer or interpolymer of acrylonitrile, in which at least 85% by weight of the polymer is acrylonitrile, in a swelling agent sufficiently volatile at comparatively low temperatures to allow the production of shaped articles of said polymer or copolymer without the drawbacks mentioned above.

The object of the invention may be accomplished by using anhydrous hydrogen fluoride as a swelling agent for poly-acrylonitrile and said copolymers of acrylonitrile.

It has been found that anhydrous hydrogen fluoride swells poly-acrylonitrile very easily even at 10° C. Since working with hydrogen fluoride on an industrial scale involves no difficulties nowadays and vessels of the usual metals (iron, nickel, aluminum, iron alloys and the like) are not attacked by anhydrous hydrogen fluoride, such pastes can be prepared easily.

Poly-acrylonitrile or the copolymers of acrylonitrile swell very quickly and easily in anhydrous hydrogen fluoride by agitating the polymers with hydrogen fluoride for a short time, whereas it often takes several hours to prepare solutions of the polymers in the solvents hitherto used, even at high temperatures. It is, however, advisable to use the polymers in the form of a fine powder or grains up to a diameter of about 1 mm. The swelling can be effected at temperatures ranging from about 0° C. up to the boiling point of anhydrous hydrogen fluoride. To prevent the hydrogen fluoride from escaping, it may in some cases be advantageous to prepare and process the pastes in closed vessels, if desired under pressure and at a temperature above the boiling point of hydrogen fluoride. The presence of water in the pastes is not desirable.

The quantities of poly-acrylonitrile or the copolymers of acrylonitrile which can be made into a paste with a certain quantity of anhydrous hydrogen fluoride, vary within certain limits. The concentrations which can be obtained depend on the polymerization degree of the polymers and, in the case of a copolymerization, also on the nature and the quantity of the further constituent or constituents of these copolymers. For the subsequent shaping operation the pastes should advantageously contain about 20—about 35 percent by weight of the polymer. A poly-acrylonitrile having a viscosity $\eta$ spec. of about 3.0 at 20° C. in dimethylformamide (1 g. of the polymer for 100 cm.$^3$ dimethylformamide) dissolves at about 10° C. in anhydrous hydrogen fluoride to a paste having a strength of about 25—about 30%. Lower molecular polymers form pastes containing about 25 to about 35% by weight of the polymer, pastes made from higher molecular polymers contain about 20% to about 30% by weight of these polymers. Copolymers of acrylonitrile, in general, dissolve more easily.

The pastes are easily shapable, more or less viscous and ropy, they do not dissolve in additional amounts of hydrogen fluoride.

The poly-acrylonitrile used can have, when dissolved in dimethylformamide (1 g. of the polymer for 100 cm.$^3$ dimethylformamide), at 20° C. a viscosity $\eta$ spec. of between about 1 and about 6.

As components for the copolymers of acrylonitrile there can be used for instance vinylesters such as vinyl formate, acetate, proprionate, butyrate, benzoate; esters of acrylic and methacrylic acid such as the methyl and ethyl esters, allyl esters e. g. allylacetate; vinyl ethers such as vinyl butyl ether; aromatic vinyl compounds such as styrene; halogen containing monomers such as vinyl chloride, vinylidene chloride; vinyl sulfones such as vinyl phenyl sulfone; esters of fumaric and maleic acid. To the paste of poly-acrylonitrile in hydrogen fluoride diluents may be added, for instance, sulfur dioxide, acetone.

The addition of dyestuffs and/or plasticizers is also possible in a simple way since there is no longer any danger that such additions will decompose at the elevated temperature.

The pastes can be processed in the usual way without special equipment. If, for instance, threads of poly-acrylonitrile are to be prepared, the paste is pressed through a nozzle into an evacuated vessel or a vessel heated, for instance, to 40° C. for example into a spinning cell through which dry heated air or a dry heated inert gas is passed. Since hydrogen fluoride boils at 19.5° C., it evaporates almost entirely under these conditions. The remaining quantities of hydrogen fluoride can be removed by washing the threads with water, if required with addition of small quantities of an alkali, or with another organic or inorganic solvent for hydrogen fluoride. The particular value of the process resides in the fact that the threads can also be prepared at normal temperature or at a moderately raised temperature. When working under reduced pressure, the temperature can even be lower. Thereby, any thermic decomposition of the poly-acrylonitrile is avoided. The evaporated hydrogen fluoride can be recuperated by compressing and/or condensing.

I claim:

1. As a new composition of matter, a paste comprising anhydrous hydrogen fluoride and a polymer of acrylonitrile selected from the group consisting of poly-acrylonitrile and copolymers of acrylonitrile with compounds containing a copolymerizable aliphatic C=C bond in which copolymers at least 85 percent by weight are acrylonitrile, said paste containing about 20 percent to about 35 percent by weight of said polymer.

2. A new composition of matter as defined in claim 1, in which the polymer of acrylonitrile is poly-acrylonitrile.

3. A new composition of matter as defined in claim 1, in which the polymer is a copolymer of acrylonitrile with vinyl-acetate.

4. A new composition of matter as defined in claim 1, in which the polymer is a copolymer of acrylonitrile with vinyl butyl ether.

5. A new composition of matter as defined in claim 1, in which the polymer is a copolymer of acrylonitrile with vinyl chloride.

6. A new composition of matter as defined in claim 1, in which the polymer is a copolymer of acrylonitrile with esters of maleic acid.

7. A composition of matter comprising an acrylonitrile polymer containing at least 85% of acrylonitrile in polymerized form dissolved in anhydrous hydrogen fluoride.

References Cited in the file of this patent

UNITED STATES PATENTS 2,485,896   Lucas et al. _____ Oct. 25, 1949